May 23, 1939.  C. B. SPINER ET AL  2,159,718

BAIT RECEPTACLE

Filed June 24, 1938

Inventors
Charles B. Spiner,
Edward Pulaski,

By J. Stanley Burch
Attorney

UNITED STATES PATENT OFFICE 2,159,718

BAIT RECEPTACLE

Charles Bernard Spiner and Edward Pulaski, Houston, Tex.

Application June 24, 1938, Serial No. 215,672

3 Claims. (Cl. 43—56)

This invention relates to receptacles for live bait, and the primary object of the present invention is to provide extremely simple means for supplying air to a compartment of the receptacle containing the bait and partly filled with water, so as to prolong the life of the bait until used.

A further object of the present invention is to provide an extremely simple, compact and durable bait receptacle having means to supply air to the water-containing chamber at a restricted and regulated rate of flow so that the air supply may be properly conserved.

The present invention particularly contemplates the provision of a receptacle for live bait including a chamber adapted to receive the bait and to be partly filled with water, an air chamber adapted to be supplied with air through the medium of a valve similar to the inflation valve of pneumatic tires, there being a wall intervening and directly separating the two chambers, and air discharge nozzles being directly mounted in this intervening wall for the direct flow of air from the air chamber to the bait and water chamber at spaced points about the latter. In this way, an extremely simple construction is had insuring most efficient supply of the air to the water in the bait chamber, and the nozzles are provided with means for regulating the flow of air therethrough so that the proper amount of air is supplied to the water according to existing conditions. Further, the bottom of the bait and water chamber is disposed on a plane above the bottom of the air chamber and is provided with a relatively large central opening having a foraminous covering and a removable imperforate closure, whereby the closure will not interfere with resting of the bait receptacle flatly upon the ground or other surface, and when the removable closure is removed, and the bait receptacle is placed in a natural stream or the like, flow of water in the stream through the bait receptacle may be had for the purpose of revivifying and prolonging the life of the bait at that time either in conjunction with or without the additional supply of air from the air chamber.

The present invention consists in the novel form, combination and arrangement of parts hereinafter more fully described, shown in the accompanying drawing and claimed.

Figure 1:
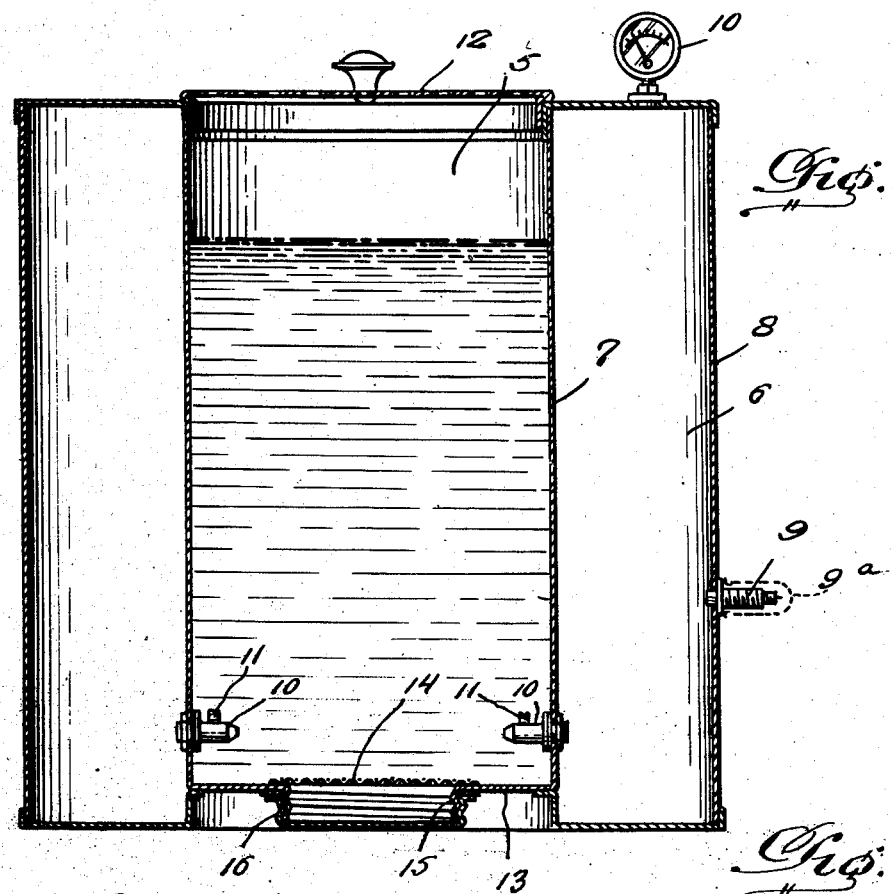
Figure 1 is a central vertical sectional view of a bait receptacle embodying the present invention.
Figure 2:
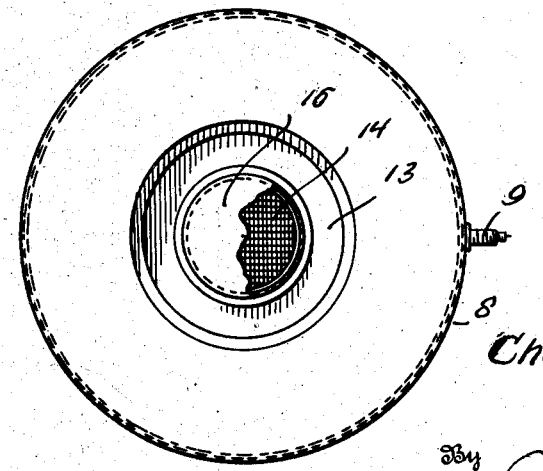
Figure 2 is a bottom plan view thereof, drawn on a smaller scale and partly broken away.
Figure 3:
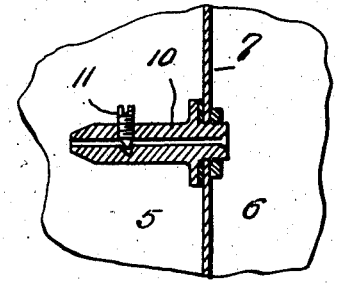
Figure 3 is an enlarged fragmentary section illustrating the manner of mounting the air discharge nozzles in openings of the wall intervening the air chamber and the bait and water chamber.

Referring in detail to the drawing, the present bait receptacle includes a sheet metal container having a chamber or compartment 5 adapted to contain the bait and to be partly filled with water as illustrated in Figure 1, and an air chamber 6 adapted to receive a supply of air under pressure. The receptacle is constructed so that there is an intervening wall 7 directly separating the chambers 5 and 6, such wall 7 being, in the embodiment illustrated, the body of the bait containing receptacle proper, and the chamber 6 being provided in surrounding relation to this wall or body and defined by an outer wall or jacket 8. The chamber 6 is airtight and the wall 8 thereof is provided with a valve 9 similar to an ordinary tire inflation valve and permitting the supply of air under pressure to the chamber 6 by means of a hand pump or the like. This valve may be provided with a removable protecting cap 9a as shown by dotted lines in Figure 1. A pressure gage 10 is preferably mounted in the top wall of air chamber 6 so that the pressure of the air in said chamber may be noted and kept below a predetermined point as well as built up to a predetermined point when use of the bait receptacle is desired. The wall 7 of the inner bait and water chamber is provided near the bottom and at spaced points about the same with openings in which are directly mounted air discharge nozzles 10 affording direct flow of air from the air chamber into the bait and water chamber 5. The flow of air through the nozzles 10 may be properly adjusted and regulated or restricted by means of valves 11 carried thereby, whereby the supply of air in chamber 6 may be properly conserved. Also, in this way the supply of air to the water and bait chamber may be increased as occasion may require, depending upon the number of bait in the chamber 5 which are to be revivified or to have the life thereof prolonged. The nozzles 10 and their arrangement provide a very satisfactory supply and distribution of the air to the water in the chamber 5, avoiding any manifolds, pipes and discharge nozzles extending from air chamber 6 and disposed within the chamber 5, respectively.

The top of bait and water chamber 6 may be closed by a suitable perforated cover 12 which permits ingress of air and minimizes splashing of water from the chamber 5, as well as preventing accidental escape of the bait from said chamber 5. The bottom wall 13 of chamber 5 is disposed on a plane above the bottom of the air chamber 6 and is provided with a relatively large central opening covered by a screen 14. When this opening is uncovered, and the bait receptacle is placed or submerged in a stream or the like, free flow of water through the chamber 5 is permitted with obvious benefit to the bait in the chamber 5. At the same time, the screen 14 prevents entrance of rubbish into the chamber 5 and escape of the bait from said chamber 5. The bottom 13 is provided in surrounding relation to this central opening with a depending neck 15 on which is provided a removable cap or closure 16 so that the bottom opening may be closed to retain the water in chamber 5 when the bait receptacle is not submerged in water. Due to arrangement of the bottom wall 13 above the plane of the bottom of chamber 6, the neck 15 and cap 16 will not interfere with placing the receptacle flatly upon the ground or other supporting surface.

From the foregoing description, it is believed that the construction and manner of use, as well as the advantages of the present invention will be readily understood and appreciated by those skilled in the art. It will be seen that the construction is very efficient and extremely simple and compact. The invention is of course capable of other embodiments than that illustrated, and minor changes in details of construction illustrated and described may be resorted to.

What we claim as new is:

1. The combination with a receptacle having a wall dividing the receptacle into an air chamber and a water-receiving chamber, a valve having communication with said air chamber and adapted for connection with air supplying means, said wall having a plurality of openings therein adjacent and at spaced points about the bottom of the water-receiving chamber, an air discharge nozzle mounted in each of said openings and affording direct discharge of air from the air chamber into said water-receiving chamber, and valves carried by said nozzles and accessible from within the water-receiving chamber to regulate the discharge of air into the latter.

2. The combination with a receptacle having a wall dividing the receptacle into an air chamber and a water-receiving chamber, a valve having communication with said air chamber and adapted for connection with air supplying means, said wall having a plurality of openings therein adjacent and at spaced points about the bottom of the water-receiving chamber, air discharge nozzles mounted in said openings and affording direct discharge of air from the air chamber into said water-receiving chamber, said wall constituting the body of the water-receiving chamber, and a jacket surrounding said wall and defining said air chamber, said valve being carried by said jacket.

3. The combination with a receptacle having a wall dividing the receptacle into an air chamber and a water-receiving chamber, a valve having communication with said air chamber and adapted for connection with air supplying means, said wall having a plurality of openings therein adjacent and at spaced points about the bottom of the water-receiving chamber, air discharge nozzles mounted in said openings and affording direct discharge of air from the air chamber into said water-receiving chamber, said air chamber being formed by a jacket surrounding the water-receiving chamber, and the bottom of said water-receiving chamber being disposed on a plane above the bottom of the air chamber and provided with a central relatively large opening, a screen covering said opening, and a removable closure for said opening disposed above the plane of the bottom of said air chamber.

CHARLES BERNARD SPINER.
EDWARD PULASKI.